United States Patent
Cain et al.

(10) Patent No.: US 11,598,418 B2
(45) Date of Patent: Mar. 7, 2023

(54) METAL TO METAL VEE SEAL

(71) Applicant: Patriot Research Center, LLC, Houston, TX (US)

(72) Inventors: Brandon Cain, Houston, TX (US); Craig Cotton, Cypress, TX (US)

(73) Assignee: Patriot Research Center, LLC, Houston, TX (US)

( * ) Notice: Subject to any disclaimer, the term of this patent is extended or adjusted under 35 U.S.C. 154(b) by 169 days.

(21) Appl. No.: 16/848,500

(22) Filed: Apr. 14, 2020

(65) Prior Publication Data
US 2021/0317914 A1 Oct. 14, 2021

(51) Int. Cl.
| F16J 15/04 | (2006.01) |
| E21B 33/12 | (2006.01) |
| F16J 15/08 | (2006.01) |
| E21B 33/04 | (2006.01) |
| F16L 19/02 | (2006.01) |

(52) U.S. Cl.
CPC ........... F16J 15/04 (2013.01); E21B 33/1212 (2013.01); F16J 15/0881 (2013.01); E21B 33/04 (2013.01); E21B 2200/01 (2020.05); F16J 15/08 (2013.01); F16L 19/0225 (2013.01); F16L 2201/30 (2013.01)

(58) Field of Classification Search
CPC .. E21B 33/04; E21B 33/1212; E21B 2200/01; E21B 47/117; F16J 15/04; F16J 15/08; F16J 15/0881; F16L 2201/30; F16L 23/162; F16L 19/0225
See application file for complete search history.

(56) References Cited

U.S. PATENT DOCUMENTS

| | | | | | |
|---|---|---|---|---|---|
| 1,935,673 | A | * | 11/1933 | Smith | F16L 23/02 285/368 |
| 3,287,034 | A | * | 11/1966 | Bragg | F16L 37/0987 285/94 |
| 4,202,410 | A | * | 5/1980 | Quebe | E21B 33/04 166/88.4 |
| 4,569,540 | A | * | 2/1986 | Beson | E21B 33/04 285/341 |
| 5,285,853 | A | * | 2/1994 | Eckert | E21B 47/117 166/383 |
| 6,009,611 | A | * | 1/2000 | Adams | F16L 15/08 285/333 |
| 6,832,762 | B2 | * | 12/2004 | Jost | F16J 15/04 285/328 |

(Continued)

*Primary Examiner* — Nicholas L Foster
(74) *Attorney, Agent, or Firm* — Ramey LLP; Jeffrey E. Kubiak (57) ABSTRACT

A system to provide at least two circumferential metal to metal seals between coaxial tubulars. Where a first tubular includes a circumferential shoulder having a circumferential first metal seal and a circumferential second metal seal. A second tubular has a circumferential shoulder that matches and abuts the first tubular circumferential shoulder. Each metal seal is of a material having a higher yield strength than the second tubular shoulder such that the first metal seal and the second metal seal will penetrate the material of the second tubular shoulder thereby providing a seal. Additionally a test port is provided from the exterior of the exterior tubular to a point on either the first or second tubular between the first and second metal seals.

6 Claims, 8 Drawing Sheets

(56) References Cited

U.S. PATENT DOCUMENTS

| | | | | |
|---|---|---|---|---|
| 7,740,061 | B2* | 6/2010 | Van Bilderbeek | E21B 33/03 166/89.1 |
| 8,950,752 | B2* | 2/2015 | Gette | E21B 33/0422 277/323 |
| 9,488,302 | B2* | 11/2016 | Gjerstad | F16L 23/18 |
| 10,393,267 | B2* | 8/2019 | Demeulenaere | F16J 15/04 |
| 10,865,616 | B2* | 12/2020 | Ingram | E21B 33/1212 |
| 11,162,620 | B2* | 11/2021 | Berghaus | B21D 41/02 |
| 2002/0180162 | A1* | 12/2002 | Jost | F16J 15/04 277/602 |
| 2004/0090016 | A1* | 5/2004 | Sharp | F16J 15/0881 277/603 |
| 2008/0017386 | A1* | 1/2008 | Van Bilderbeek | E21B 33/03 166/195 |
| 2010/0127459 | A1* | 5/2010 | Cole | F16J 15/04 277/304 |
| 2011/0308793 | A1* | 12/2011 | Fenton | E21B 17/08 166/207 |
| 2011/0316236 | A1* | 12/2011 | Gette | E21B 33/0422 277/312 |
| 2013/0285369 | A1* | 10/2013 | Gjerstad | F16L 23/167 285/119 |
| 2017/0299059 | A1* | 10/2017 | Demeulenaere | F16J 15/04 |
| 2019/0257171 | A1* | 8/2019 | Ingram | E21B 33/04 |
| 2020/0271252 | A1* | 8/2020 | Berghaus | B21D 41/02 |

\* cited by examiner

Figure 1

(Prior Art)

METAL TO METAL VEE SEAL

BACKGROUND

A typical oil and gas well generally has a wellhead at the surface. Usually the wellhead includes a housing which supports one or more casing hangers located at the upper end of one or more strings of tubing extending into the well. Generally, the wellhead is one of two types, a flange type wellhead or a flangeless wellhead. With either type of wellhead, each time a casing or tubing string is lowered into the well a seal is needed at the wellhead between the wellhead and the upper end of the casing or tubing string or, when multiple casing or tubing strings are used, a seal is needed between the upper end of the last casing or tubing string to be lowered within the well and the upper end of the previously lowered casing or tubing string.

When a flange type connection is used a metal crush gasket is placed between the lower flange and the upper flange. Generally, bolts and nuts are used to draw the upper flange and the lower flange together as the nuts are torqued onto the bolts. With the bolts and nuts torqued together such that the upper and lower flanges are drawn together crushing the metal gasket between the upper and lower flange is a seal between the upper and lower flange is created by the crush gasket. It is useful to test the seal, generally a port is in place to allow fluid access between the metal crush gasket and the inner diameter of the flanges. In addition, a subassembly must be run into the well that will seal across the lower flange to the upper flange in order to pressure test the metal crush gasket.

Currently when a flangeless wellhead is used generally, elastomeric seals are used. In the limited instance where a metal seal is used, presently, there is no ability to test the integrity of the metal seal.

SUMMARY

The current invention is two metal to metal seals between two tubulars with a provision for testing the integrity of the seal. More specifically a circumferential shoulder or in some cases a protrusion is formed on the inner diameter of a first tubular and a mating circumferential shoulder is formed on an outer diameter of a second tubular. The shoulder on the first tubular includes a first and a second protrusion where the first and second protrusions are offset radially one from the other. The shoulder on the second tubular provides a mating surface for the first and second protrusions where the first and second protrusions are formed of a material having a higher yield strength than the mating surface on the second tubular. With the first and second protrusions in position against the mating surface, a variable axial load is provided to force the first shoulder into closer proximity to the second shoulder. As the first shoulder is forced in closer proximity with the second shoulder the protrusions on the first shoulder, having a higher yield strength than the material of the first tubular mating surface or the second tubular mating surface the material of the second shoulder, will penetrate the material of the second shoulder forming a barrier to fluid passage. Generally, a fluid pathway is provided from the exterior of outer tubular to a point on either the first or second shoulder circumferentially between the first and second protrusion. The fluid pathway can be pressurized in order to determine whether or not a seal has been formed between the first and second protrusions. In the event that it is determined that a seal has not been formed an additional axial load may be provided by the variable axial load in order to further penetrate the protrusions into the second material.

In another embodiment, as before, a circumferential shoulder or protrusion is formed on an inner diameter of a first tubular and a mating circumferential shoulder is formed on an outer diameter of the second tubular. A first and a second metal ring is provided. The first and second metal ring are placed between the circumferential shoulder on the inner diameter of the first tubular and the mating surface on the outer diameter of the second tubular. The first and second metal rings are circumferentially offset one from the other. In some instances, a groove or recess for each ring may be provided in either the first tubular mating surface or the second tubular mating surface. The first and second metal ring are formed of a material having a higher yield strength than the mating surface on both the first and second tubular. A variable axial load is provided to force the first shoulder into closer proximity with the second shoulder. As the first shoulder is forced into closer proximity with the second shoulder, the first and second metal rings, having a higher yield strength in the material of the first tubular mating surface or the second tubular mating surface, will plastically deform the material of both the first tubular mating surface and the second tubular mating surface forming a barrier to fluid passage. Generally, a fluid pathway is provided from the exterior of outer tubular to a point on either the first or second shoulder circumferentially between the first and second metal rings. The fluid pathway can be pressurized in order to determine whether or not a seal has been formed between the first and second metal rings. In the event that it is determined that a seal has not been formed an additional axial load may be provided by the variable axial load in order to further deform the first and second metal rings into the material of the first and second shoulders.

DETAILED DESCRIPTION

The description that follows includes exemplary apparatus, methods, techniques, or instruction sequences that embody techniques of the inventive subject matter. However, it is understood that the described embodiments may be practiced without these specific details.

Figure 1:
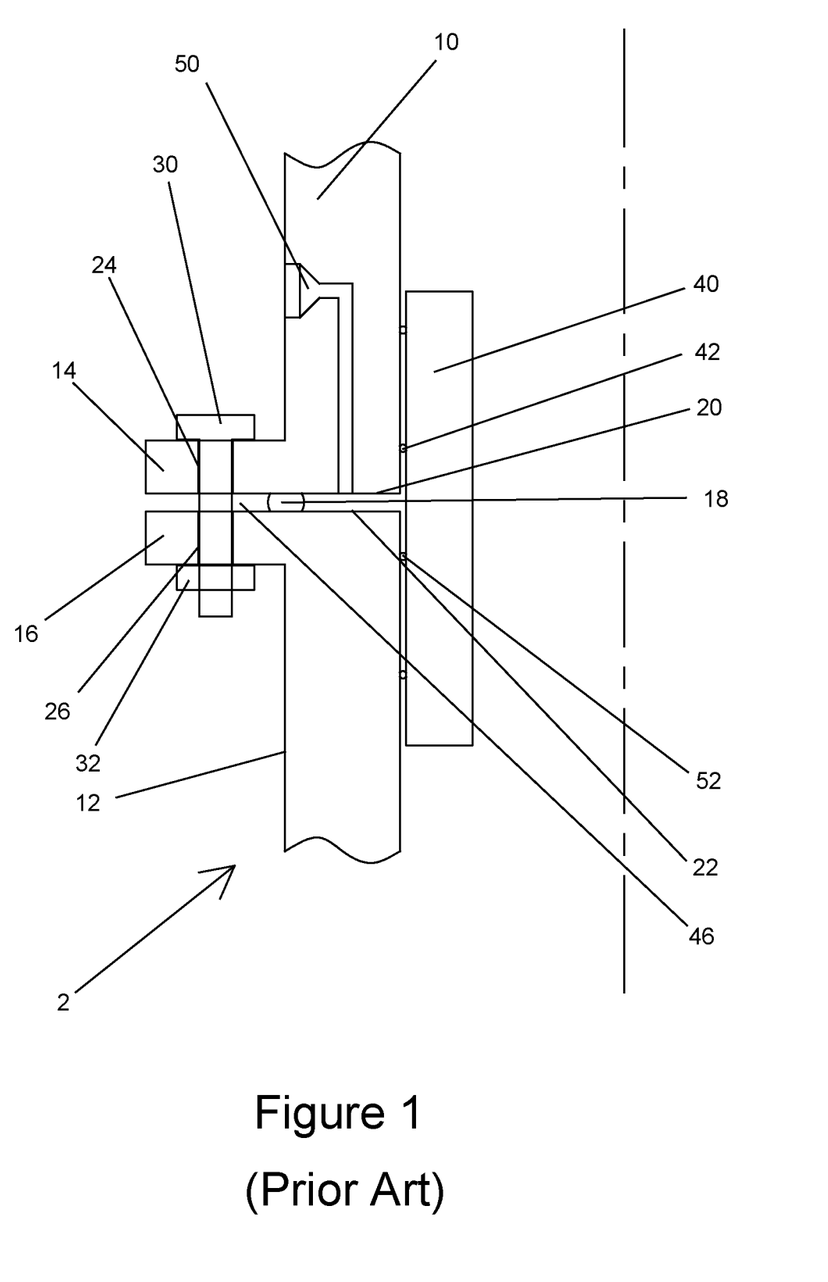
FIG. 1 depicts a side view drawing of a prior art flanged system having a metal to metal seal.

FIG. 1 depicts a side view drawing of a prior art flanged system having a metal to metal seal. FIG. 1 shows an upper tubular 10 having an upper flange 14 and a lower tubular 12 having a lower flange 16. A gap 46 is created between the upper flange 14 and lower flange 16. The crush ring gasket 18 is placed below the lower shoulder 20 of the upper flange 14 and above the upper shoulders 22 of the lower flange 16. The upper shoulder 14 has a bolthole 24 while the lower shoulder 16 has a bolthole 26. The bolthole 24 and 26 are aligned so that a bolt or stud 30 may be placed through both bolthole 24 and 26. Generally a nut 32 is threaded onto the bottom of the bolt or stud 30. Generally, the upper shoulder 14 and the lower shoulder 16 have bolt holes circumferentially spaced around the centerline of the upper and lower tubulars. As the bolts 30 and nuts 32 are torqued about the centerline of the tubular the upper flange 14 and the lower flange 16 are drawn together crushing the crush ring gasket 18 to create a seal between the upper flange 14 and lower flange 16.

With the bolts 30 and nuts 32 torqued to cause the crush ring gasket 18 to create a seal between the upper flange 14 and lower flange 16. In order to test the seal a subassembly 40 is lowered into the flange system 2. Subassembly 40 generally has at least a first O-ring 42 and a second O-ring 44. The subassembly is lowered into the flange system to until the first O-ring 42 is located above gap 46 and the second O-ring 44 is located below gap 46. Test port 50 may then be utilized to supply pressure into the test area 52 sealed by crush ring gasket 18, first O-ring 42 and second O-ring 44 in order to test the effectiveness of the seal created by crush ring gasket 18.

Figure 2:
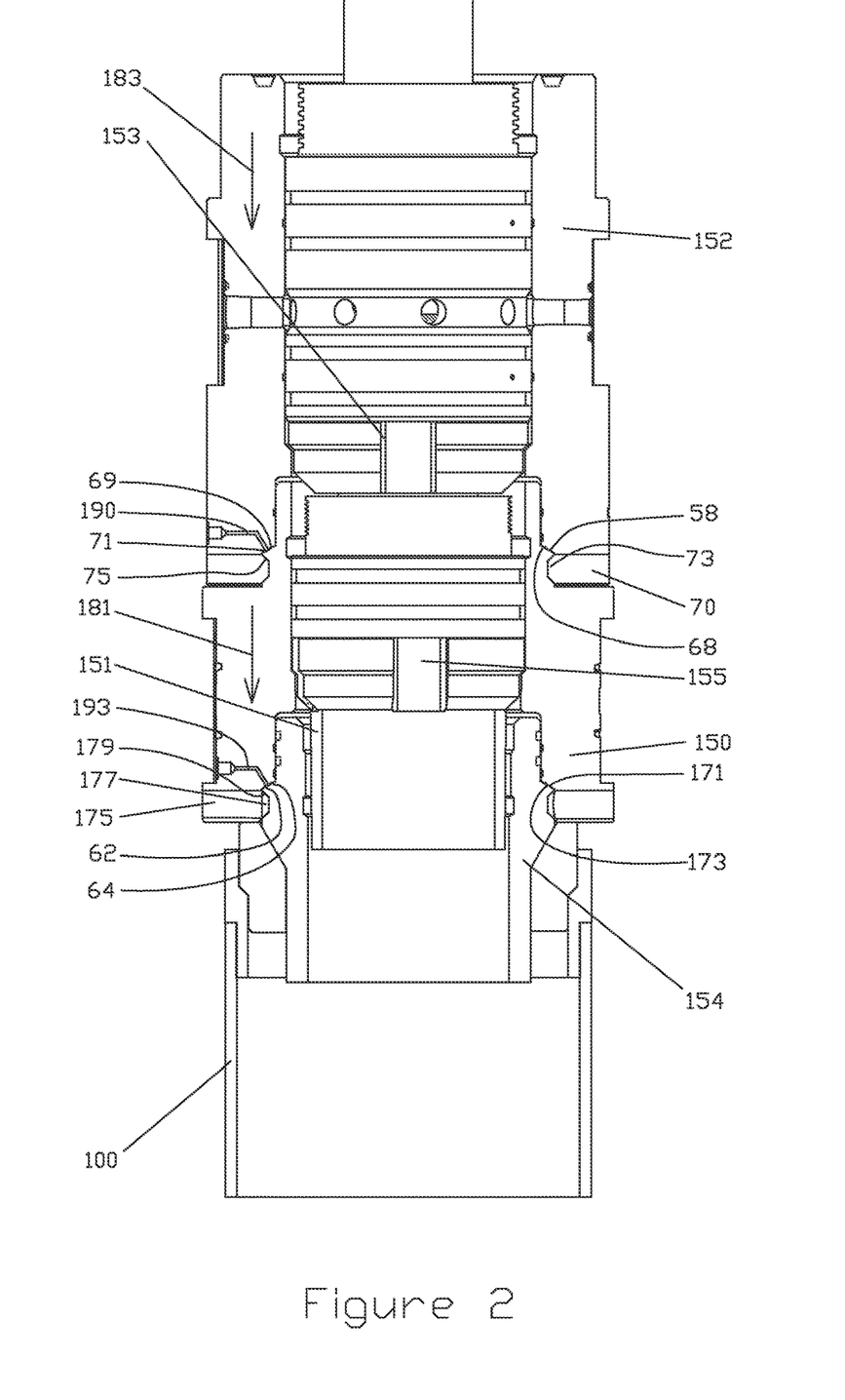
FIG. 2 depicts a side view drawing of an unconventional, through bore, drill through, unflanged wellhead having a testable metal-metal vee seal.

FIG. 2 depicts a side view drawing of an unconventional, through bore, drill through, unflanged wellhead having a testable metal-metal vee seal. More specifically FIG. 2 depicts an un-flanged wellhead 100 having a first tubing hanger 150, a second tubing hanger 152, and the third tubing hanger 154. Tubing 151 is inserted into the inner bore of tubing hanger 154 until shoulder 171 of tubing hanger 150 contacts first circumferential protrusion 62 and second circumferential protrusion 64 protruding from shoulder 173 of tubing hanger 154. With circumferential protrusions 62 and 64 in contact with shoulder 171, grub screws are placed in circumferentially spaced bores 175. In certain instances the throughbore of a tubular may not be round, but may be oval, multiple intersecting circles, or even square, in those instances the shoulders and first and second protrusions should encompass the throughbore of the tubulars in order to effect a fluid tight seal. Each of the grub screws in turn include a tapered end that fits within divot 177. The divots 177 may be localized for each grub screw or may be located in a circumferential slot around the exterior of the tubing hanger or tubular. As the tapered end of the grub screw enters the divot 177 interaction between the end of the tapered grub screw and shoulder 179 of divot 177 imparts an axial load in the direction of arrow 181 forcing shoulders 171 and 173 closer together and thereby forcing protrusions 62 and 64 into shoulder 171 of tubing hanger 150. Protrusions 62 and 64 are each made of a material that has a higher yield strength than the material of tubing hanger 150. Generally, protrusions 62 and 64 are of a V shape where the point of each protrusion contacts the material to be penetrated. As the V penetrates an ever-increasing amount of material of the opposing shoulder is deformed increasing the effectiveness of the seal as the axial load, as depicted by arrow 181, provided by the grub screw's interaction with shoulder 179 increases.

As shown in FIG. 2 multiple axially offset, testable, metal-metal seals may be used in a single wellhead. In this instance tubing hanger 150 includes a second shoulder 68. Tubing 153 is guided into the interior bore 155 of tubing hanger 150. Eventually tubing hanger 152 will reach tubing hanger 150. As tubing hanger 152 is guided onto tubing hanger 150 shoulder 58 of tubing hanger 152 will reach shoulder 68 of tubing hanger 150. Where initially shoulder 58 of tubing hanger 152 contacts shoulder 68's first circumferential protrusion 69 and shoulder 68's second circumferential protrusion 71. With circumferential protrusions 69 and 71 in contact with shoulder 58, additional grub screws are placed in circumferentially spaced bores 70. Each of the grub screws in turn include a tapered end that fits within divot 73. As the tapered end of the grub screw enters the divot 73 interaction between the end of the tapered grub screw and shoulder 75 of divot 73 imparts an axial load in the direction of arrow 183 forcing shoulders 58 and 68 closer together and thereby forcing protrusions 69 and 71 into shoulder 58 of tubing hanger 152. As before, protrusions 69 and 71 are each made of a material that has a higher yield strength than the material of tubing hanger 152. A test port 190 providing a fluid pathway to a point located radially from the centerline to a location between protrusion 69 and 71 is furnished to allow pressure testing to test the efficacy of the seal created by protrusions 69 and 71 penetrating the material of tubing hanger 150 choose shoulder 58. A similar test port 193 may be provided to access the location between protrusions 62 and 64. Generally protrusions 69 and 71 are of a V shape where the point of the contacts the material to be penetrated. In the event that there is a leak between the metal to metal seal provided by protrusions 69 and 71 the axial load depicted by arrow 183 may be increased. As the V of each protrusion 69 and 71 penetrates an ever-increasing amount of material of the opposing shoulder is deformed increasing the effectiveness of the seal as the axial load, as depicted by arrow 183, provided by the grub screw's interaction with shoulder 58 increases.

Figure 3:
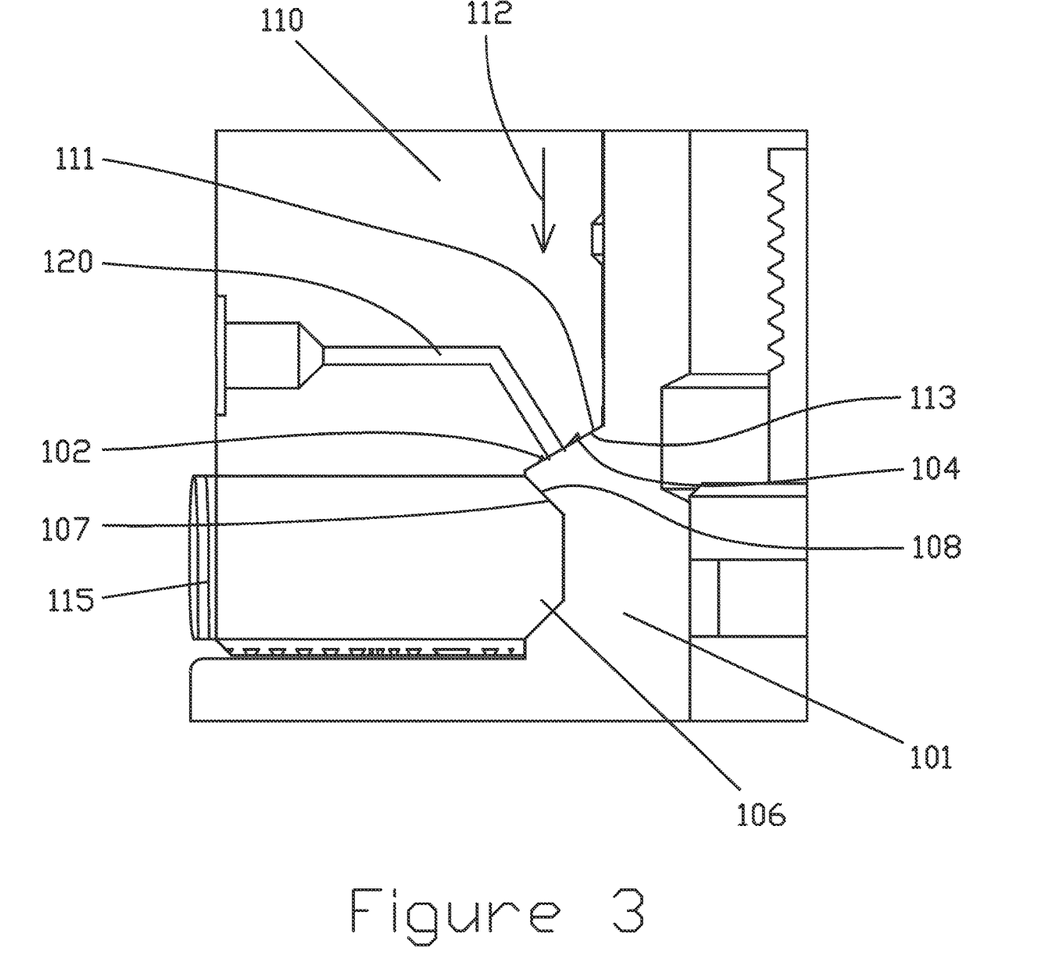
FIG. 3 depicts a side view of a shoulder to shoulder mating area of a first and second tubular with a testable metal-metal vee seal.

FIG. 3 is a close-up of a first tubing hanger 101 having a second tubing hanger 110 landed in place around first tubing hanger 101. As can be seen tubing hanger 110 has shoulder 111 where shoulder 111 is in contact with a first protrusion 102 and a second protrusion 104 on shoulder 113 of tubing hanger 101. A grub screw 115 have been threaded into its slot such that the tapered end 106 of the grub screw 115 is in contact with the shoulder 108 of divot 107 as the tapered grub screw 115 is further threaded into its slot the tapered end 106 of the grub screw 115 presses against the angled shoulder 108 of divot 107 imparting an axial force against tubing hanger 110 in the direction of arrow 112. The axial force in the direction of arrow 112 forces the protrusions 102 and 104 into the material of shoulder 111 of tubing hanger 110. Each of the protrusions 102 and 104 is constructed of a material having a higher yield strength than the material of shoulder 111. As the V points of each of the protrusions 102 and 104 are forced into the material of shoulder 111 the protrusions 102 and 104 along with the material shoulder 111 and 113 create a metal-metal seal. A fluid pathway is provided by access port 120 to a point along the interface of shoulders 111 and 113 between protrusions 102 and 104. By pressurizing the fluid pathway provided by access port 120 metal to metal seal created by protrusions 102 and 104 may be tested. In the event that a seal is not created additional force may be imparted to grub screw 115 and thereby to the tapered end 106 and thus to shoulder 108 to create an additional axial force in the direction of arrow 112 which in turn further drives protrusions 102 and 104 into the material of shoulder 111 increasing the effectiveness of the seal created by protrusions 102 and 104.

Figure 4:
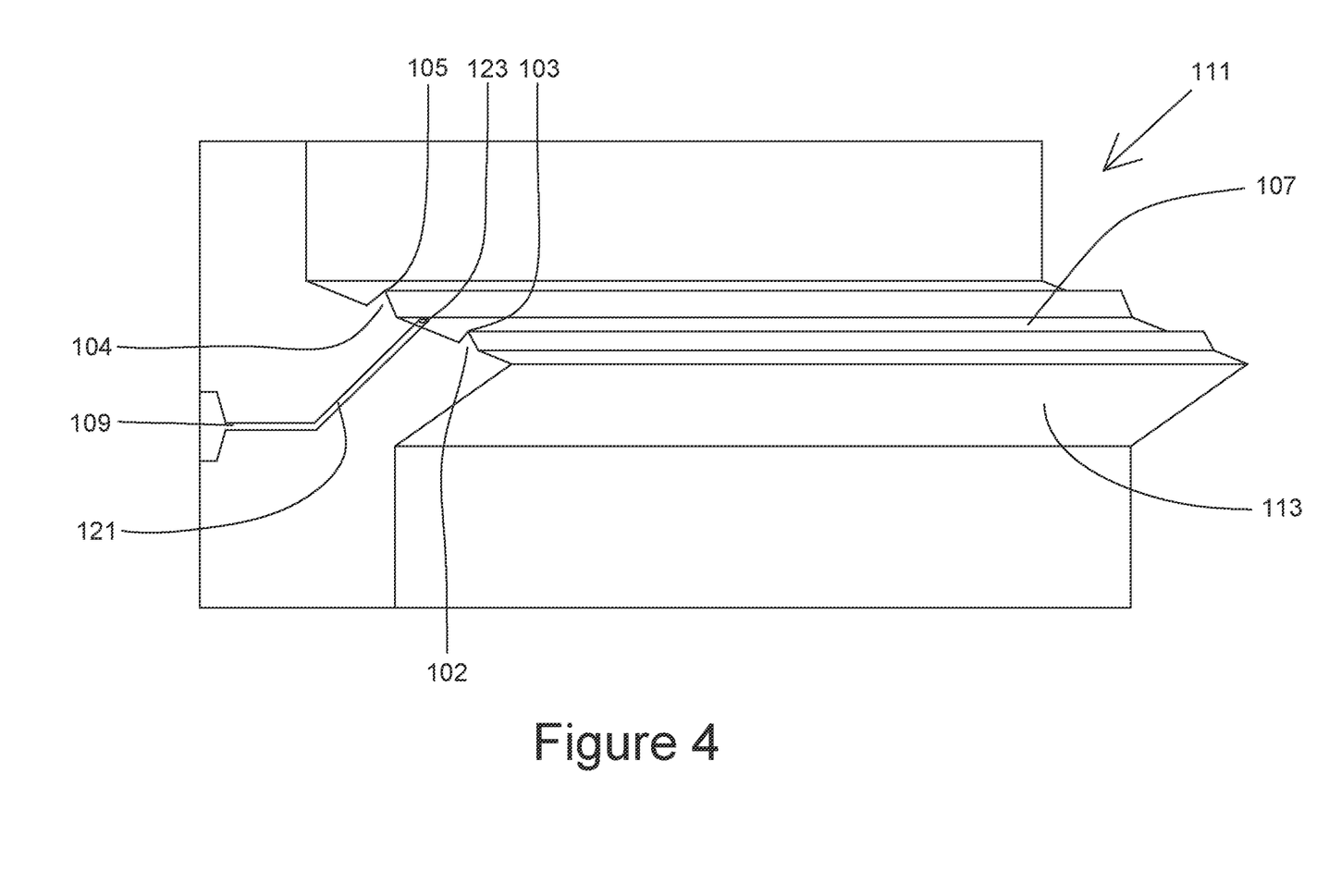
FIG. 4 depicts an orthogonal view of a portion of a tubular having a first and second metal sealing ring.

FIG. 4 is an orthogonal view of a portion of a tubing hanger such as tubing hanger 101. Tubing hanger 101 has a shoulder 113. The shoulder 113 in turn has a first protrusion 102 and a second protrusion 104. In this instance both the first protrusion 102 and 104 have an inverted V shape. The inverted V shape of protrusions 100 to 104 allows the point 103 of protrusion 102 and the point 105 of protrusion 104 two initially contact and opposing shoulder and penetrate the material of the opposing shoulder to create a metal to metal seal in the gap 107 between protrusions 102 and 104. A test port 109 is provided on an exterior of the tubing hanger 101. The test port 109 provides a fluid pathway 121 to a location 123 on shoulder 113 between the first protrusion 102 and the second protrusion 104.

Figure 5:
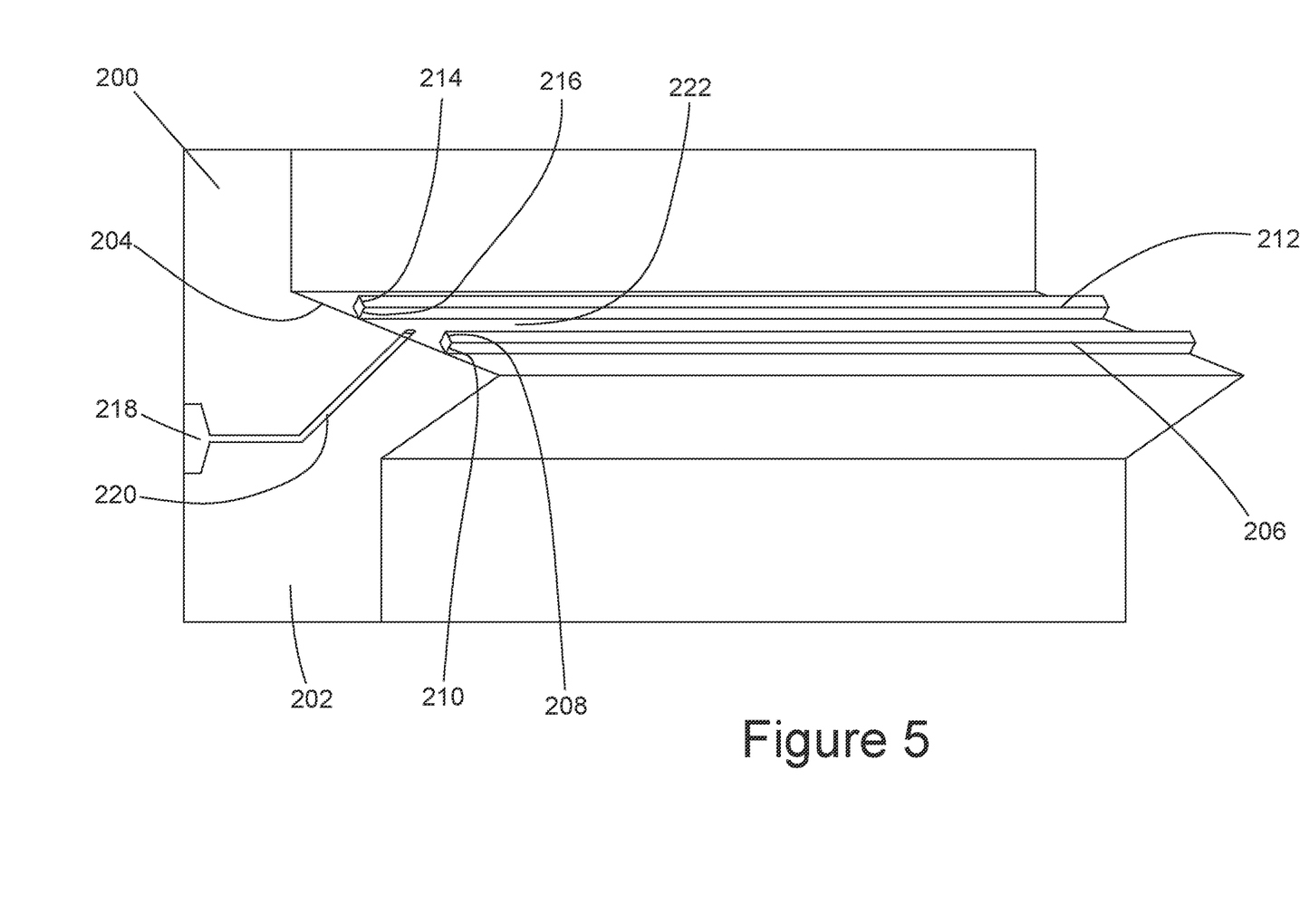
FIG. 5 depicts two metal vee rings and shoulder.

FIG. 5 depicts a portion of a tubular having a shoulder and using two metal rings to deform mating shoulders to form a testable metal-metal seal. A first tubular 200, usually a tubing hanger, has a protrusion 202 that extends into the inner diameter of the tubular 200. The protrusion 202 has a shoulder 204. A first metal ring 206 includes an upper V 208 and a lower V 210. A second metal ring 212 also has an upper V 214 and a lower V 216. A second tubular having a downward facing and mating shoulder may be landed on tubular 200 such that the downward facing and mating shoulder of the second tubular would come into contact with shoulder 204 but for the first metal ring 206 and the second metal ring 212. As the downward facing mating shoulder is forced into closer proximity with shoulder 204 the upper vees 208 and 214 of the first metal ring 206 and the second metal ring 212 will penetrate the material of the second tubular's downward facing and mating shoulder while the lower vees 210 and 216 of the first metal ring 206 and the second metal ring 212 will penetrate the material of shoulder 204. A test port 218 is provided on an exterior of the first tubular 200 the test port 218 provides a fluid pathway 220 to a location 222 on shoulder 204 between the first metal ring 206 and the second metal ring 212. Each of the first metal ring 206 and the second metal ring 212 is constructed of a material having a higher yield strength than either shoulder 204 or the second tubular's downward facing and mating shoulder. While generally the rings and protrusions are constructed in the shape of a vee any shape that will allow the protrusion or rings to penetrate the material of the opposing shoulder may be used.

Figure 6:
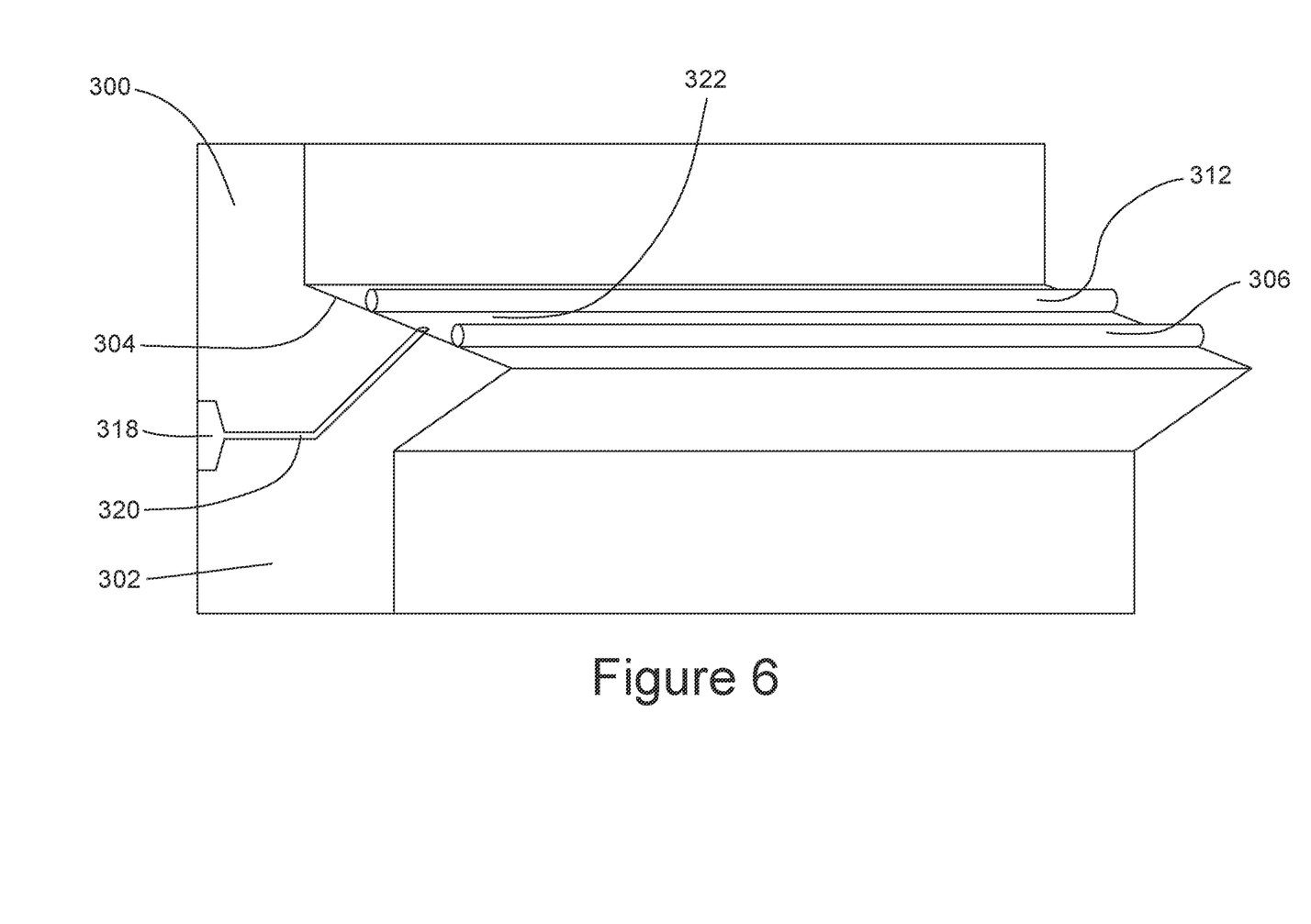
FIG. 6 depicts two crushable metal rings and a shoulder.

FIG. 6 depicts a portion of a tubular having a shoulder and using two crushable metal rings to form a testable metal-metal seal. A first tubular 300, usually a tubing hanger, has a protrusion 302 that extends into the inner diameter of the tubular 300. The protrusion 302 has a shoulder 304. A first deformable metal ring 306 may also be round, square, elliptical or any other deformable shape. The first and second metal rings do not need to be the same shape. A second tubular having a downward facing and mating shoulder may be landed on tubular 300 such that the downward facing and mating shoulder of the second tubular would come into contact with shoulder 304 but for the first metal ring 306 and the second metal ring 312. As the downward facing mating shoulder is forced into closer proximity with shoulder 304 the first and second ring will deform to form a metal seal. A test port 318 is provided on an exterior of the first tubular 300 the test port 318 provides a fluid pathway 320 to a location 322 on shoulder 304 between the first metal ring 306 and the second metal ring 312. Each of the first metal ring 306 and the second metal ring 312 is constructed of a material having a lower yield strength than either shoulder 304 or the second tubular's downward facing and mating shoulder.

Figure 7:
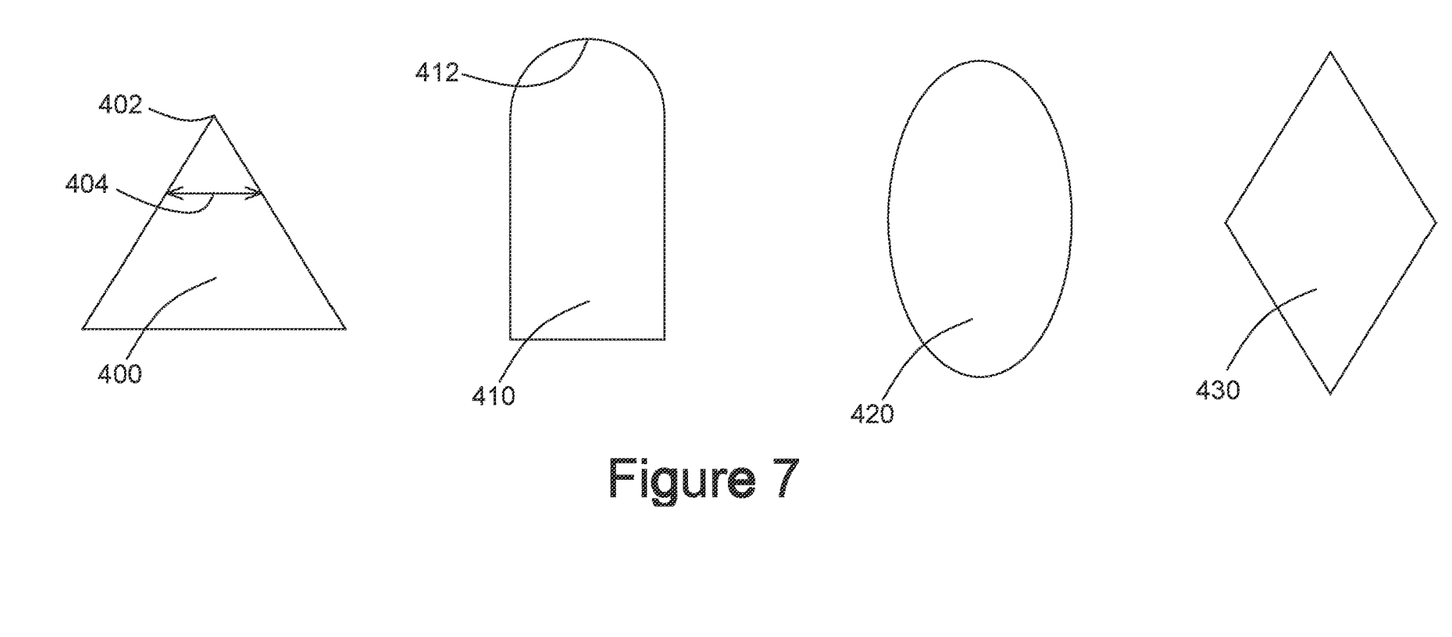
FIG. 7 depicts a side view of a vee profile, a round nose profile, and a vee ring profile.

FIG. 7 depicts several metal ring cross-section shapes. The first shape depicted 400 is the preferred vee shape where the upward point 402 will first contact the material of an opposing shoulder. The upward point 402 generally requires the least amount of force to begin penetrating the material of the opposing shoulder. As the vee penetrates the opposing shoulder the width of the penetrating vee progressively increases such as at width 404. Additional material of the shoulder is displaced requiring greater amounts of force as the vee penetrates. Other shapes may be used as well such as the rounded nose 412 of shape 410. As shape 410 contacts and penetrates an opposing shoulder the rounded nose 412 upon initial contact displaces a greater amount of material than the point 402 of the 400 thereby initially requiring a greater amount of axial force to penetrate the material of the opposing shoulder. The oval-shape 420 may be utilized as a crush ring when a material having a lower strength than the material of an opposing shoulder is used. The oval-shaped 420 may be utilized as a double penetrator when a material having a higher yield strength than the material of an opposing shoulder is used as the oval-shaped ring 420. In some instances, the oval-shape ring 420 may be utilized as both a penetrator and a crush ring when the oval-shaped ring 420 has a higher yield strength than a first opposing shoulder and a lower yield strength than the second opposing shoulder. The double vee 430 may be utilized as a double penetrator when a material having a higher yield strength than the material of an opposing shoulder is used as the double vee ring 430. In some instances, the double vee ring 430 may be utilized as both a penetrator and a crush ring when the double vee ring 430 has a higher yield strength than a first opposing shoulder and a lower yield strength and the second opposing shoulder.

Figure 8:
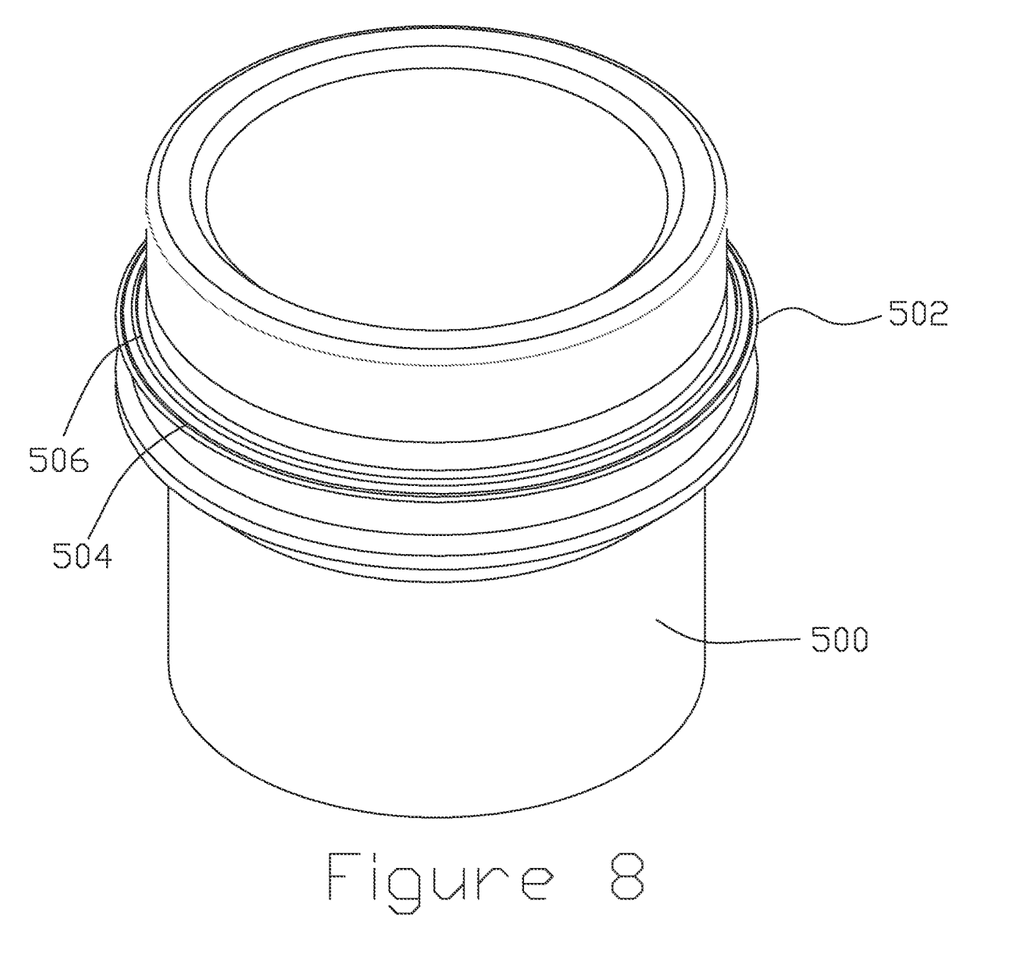
FIG. 8 depicts a top down view of a circular tubular having a testable metal-metal seal.

FIG. 8 depicts an orthogonal view of a circular tubular having a testable metal-metal seal. The circular tubular 500 is similar to the tubing hanger 150 in FIG. 2 and has a shoulder 502 and having a first circumferential protrusion 504 and a second circumferential protrusion 506.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:
1. A metal-metal seal comprising;
 a first tubing hanger having a circumferential frustroconical first shoulder,
 a second tubing hanger having a circumferential frustroconical second shoulder,
  wherein the second tubing hanger circumferential frustroconical second shoulder is adjacent to and in opposition to the first tubing hanger circumferential first shoulder,
  the first tubing hanger circumferential frustroconical first shoulder having a first circumferential protrusion and a radially offset second circumferential protrusion, and
  wherein the first circumferential protrusion or the second circumferential protrusion is a material having a higher yield strength than the circumferential second shoulder such that the first circumferential protrusion or the second circumferential protrusion penetrates the second tubing hanger circumferential frustroconical shoulder as the first circumferential protrusion or the second circumferential protrusion are brought into contact with the second tubing hanger circumferential frustroconical shoulder.

2. The metal-metal seal of claim 1, wherein the first circumferential protrusion and the second circumferential protrusions are vees.

3. The metal-metal seal of claim 1, wherein the first circumferential protrusion and the second circumferential protrusions are rounded.

4. A metal-metal seal comprising;
- a first tubing hanger having a circumferential frustroconical first shoulder,
- a second tubing hanger having a circumferential frustroconical second shoulder,
  - wherein the circumferential second shoulder is adjacent to and in opposition to the first tubing hanger circumferential frustroconical first shoulder,
  - the first tubing hanger circumferential frustroconical first shoulder having a first circumferential protrusion and a radially offset second circumferential protrusion,
  - the first tubing hanger further providing a fluid pathway from an exterior of the first tubing hanger to a circumferentially open area bounded by the first tubing hanger circumferential frustroconical first shoulder, the second tubing hanger circumferential frustroconical second shoulder, the first tubing hanger circumferential first protrusion, and the second tubing hanger circumferential second protrusion, and
  - wherein the first circumferential protrusion or the second circumferential protrusion is a material having a higher yield strength than the circumferential second shoulder such that the first circumferential protrusion or the second circumferential protrusion penetrates the second tubing hanger circumferential frustroconical shoulder as the first circumferential protrusion or the second circumferential protrusion are brought into contact with the second tubing hanger circumferential frustroconical shoulder.

5. The metal-metal seal of claim 4, wherein the first circumferential protrusion and the second circumferential protrusions are vees.

6. The metal-metal seal of claim 4, wherein the first circumferential protrusion and the second circumferential protrusions are rounded.

* * * * *